May 25, 1965 C. M. DAVIS 3,185,822

BINARY ADDER

Filed Dec. 1, 1961

INVENTOR
CLAUD M. DAVIS

BY David N. Koffsky

AGENT 3,185,822
Patented May 25, 1965

3,185,822

BINARY ADDER

Claud M. Davis, Poughkeepsie, N.Y., assignor to International Business Machines Corporation, New York, N.Y., a corporation of New York Filed Dec. 1, 1961, Ser. No. 156,288
6 Claims. (Cl. 235—153)

This invention relates to automatic computing devices and more particularly, to digital adders for adding binary numbers.

In order to add two binary number, a circuit, commonly known as a full adder, is provided to generate output manifestations of the sum of the binary numbers to be added. A full adder has there inputs of which one is for a single binary digit of the augend, another for a single binary digit of the addend, and one for an input carry. It has two ouputs, one for the sum and one for the output carry.

In a parallel adder, the addition circuitry comprises one full adder for each binary order with provision for carry generation to successive orders. A serial adder has only one full adder for all orders.

In a serial adder, the carry output is fed back to the carry input when the next higher order digits of the addend and the augend are entered into the full adder. In this manner, the multidigit sum is generated digit by digit in time sequence.

In a binary full adder, the logical functions necessary to generate the proper sum and carry output are usually performed by a plurality of individual logic circuits. Theoretically, therefore, each logic circuit will always give an output which is the predetermined function of the input. In practice, however, certain conditions sometimes cause a particular parameter within these logic circuits to change to the extent that the output becomes erroneous. In order to detect an incorrect result obtained due to such an error, techniques have been devised for checking the final result against the input variables. One such system is known in the art as a parity check and an example is disclosed in the similarly assigned copending application of Donald A. Harrison et al., Serial No. 753,342 now Patent No. 3,036,770. A parity check consists of a check to determine whether an odd or even number of "ones" exist at any one time. The system operates on the principle that the sum modulo two of the parities of the addend, the augend, the sum, and the carries performed in an addition operation should always equal zero. If the sum modulo two of the parities does not equal zero, an error indication will be generated. The detection of the errors depends in part, therefore, upon counting the parity of the carries performed during an addition operation and also upon counting the parity of the final sum generated in an addition operation.

In the familiar parity check operation, two erroneous parity indications often cancel each other and give the appearance that no erroneous condition existed. Such a condition may occur, for example, when an erroneous carry causes an error in the count of the parity of the carries, and also causes an error in the sum of the adjacent higher order stage which is dependent upon the carry. The erroneous parity of the carries and the erroneous parity of the sum will cancel out and cause the error check equipment to indicate that no error has occurred.

Another problem in such a system is the possibility that the error checking equipment itself may fail. It is desirable, therefore, to provide a minimum amount of such redundant circuitry which is subject to failure.

It is, therefore, an object of this invention to provide apparatus for decreasing the number of erros which can escape undetected in an adder for binary numbers.

It is another object of this invention to provide a binary full adder which will enable error detecting systems to detect a greater number of single failures in a parallel binary adder.

A further object of this invention is top provide an adder which requires a minimum amount of redundant equipment.

An object of this invention is to provide a full adder circuit which will reduce the number of undetected errors in a serial adder.

Another object of this invention is to provide an adder which will decrease the probability that a single failure in the adder will cause two erroneous parity manifestations.

In the present invention, the full adder circuits are logically arranged to force an error in the sum whenever a carry output is generated which does not agree with the input variables. The carry output is compared with the inputs to cause the sum signal to be suppressed if certain conditions exist or to be fictiosly generated if certain other conditions exist. By generating the second error in a particular stage of a parallel adder, the erroneous carry will cause an odd number of parity errors which can therefore be detected.

The foregoing and other objects, features and advantages of the invention will be apparent from the following more particular description of a preferred embodiment of the invention, as illustrated in the accompanying drawings.

Figure 1:
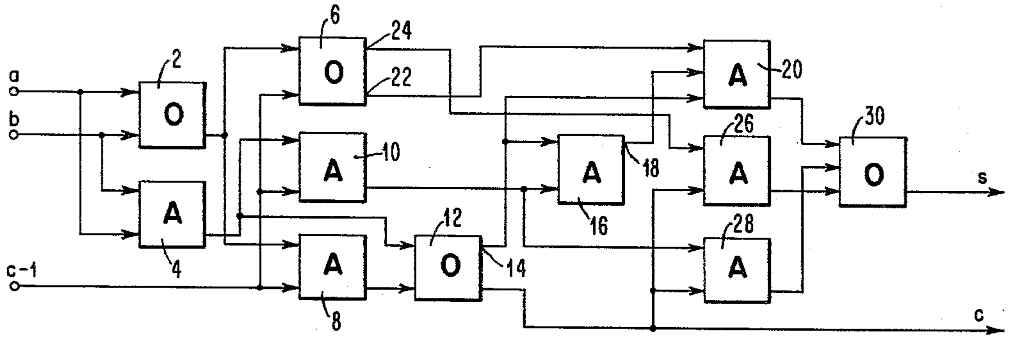
FIG. 1 is a block diagram of a binary full adder utilizing the invention.

Referring now to the drawings, FIG. 1 shows a preferred embodiment of the full adder circuit. The augend digit input is designated as input $a$, the addend digit input is designated as input $b$ and the carry input from the next lower order stage is designated $c$–1. The sum output is designated $s$ and the carry output $c$.

The logic blocks which are utilized in the adder are AND and OR circuits of types well-known in the art. Output lines which appear at the upper portion of a logic block indicate an inverted output.

Inputs $a$ and $b$ condition both OR circuit 2 and AND circuit 4. The output of OR circuit 2 conditions OR circuit 6 and AND circuit 8, and the output of AND circuit 4 conditions AND circuit 10 and OR circuit 12. Likewise, OR circuit 6 and AND circuits 8 and 10 are conditioned by input $c$–1. OR circuit 12 is also conditioned by the output of AND circuit 8. The output $c$ of OR circuit 12 is the carry output of the adder and its generation is accomplished by OR circuit 2, AND circuit 4, AND circuit 8 and OR circuit 12. Output 14 of OR circuit 12 is the complement of the $c$ output and both the complement output 14 and the carry output are utilized in the sum generation circuitry to insure that if the *c* output does not compare with the expected output of the remainder of the circuitry, a false sum will be generated.

AND circuit 16 is conditioned by the complement output 14 of OR circuit 12 and by the output of AND circuit 10 to generate a signal at the complement output 18 which conditions AND circuit 20. Since only the complementary output 18 of AND circuit 16 is utilized, it is equivalent to an AND-NOT circuit. AND circuit 20 is additionally conditioned by the output 22 of OR circuit 6 and the complementary output 14 of OR circuit 12. AND circuit 26 is conditioned by the complementary output 24 of OR circuit 6 and also by the *c* output of OR circuit 12. AND circuit 28 is conditioned by the output of AND circuit 10 and by the *c* output of OR circuit 12. An OR circuit 30 is conditioned by the output of AND circuits 20, 26, or 28 to generate the sum output of the full adder circuit.

It will be appreciated by those skilled in the art that a full adder circuit having three inputs will have eight possible combinations of binary input variables. Since the purpose of this circuit is to cause an error to occur in the sum if an error occurs in the carry output of the full adder stage, there are eight possible errors in the carry which must be detected and utilized to alter the sum output. In the following explanation the eight combinations are discussed with relation to the erroneous carry and the means for altering the sum.

If all three of the input variables are ONE, the carry should be ONE and the sum should be ONE. If the carry generated is ZERO, the complement output 14 of OR circuit 12 will, in conjunction with the output of AND circuit 10, decondition the output 18 of AND circuit 16, which will then inhibit any output from AND circuit 20. The ZERO carry output signal itself will prevent AND circuit 26 and AND circuit 28 from generating an output and, therefore, no inputs will be present at OR circuit 30 and the sum output will be ZERO.

Another group of possible combinations of the input variables are those three combinations in which any two of the input variables are ONE and the other input variable is a ZERO. With these combinations present, the sum should be ZERO and the carry ONE. If a ZERO carry is generated, an incorrect sum is generated by AND circuit 20. More specifically, if the carry output signal is ZERO due to some failure in the carry generation, the carry complement output 14 of OR circuit 12 will condition one of three inputs of AND circuit 20 and an input of AND circuit 16. This is true for all three of the combinations of this group.

With the input combination present in which *a* and *b* are both ONE, an output will be generated from OR circuit 2 and also from AND circuit 4. The output from OR circuit 2 will condition OR circuit 6 to provide the second of three inputs to AND circuit 20. AND circuit 4 will condition one input to AND circuit 10 but the other input is not conditioned by the ZERO carry input *c*–1. Therefore, the output of AND circuit 10 will not condition one input of AND circuit 16 and complement output 18 will provide the third input to AND circuit 20. The output of AND circuit 20 will condition the OR circuit 30 to provide the erroneous sum output of ONE.

A second combination of this group is that in which the *a* and the *c*–1 inputs are ONE. With this combination present, OR circuit 2 is conditioned which, in turn, conditions OR circuit 6 which supplies the second of three inputs to AND circuit 20. Since the *b* input is ZERO, AND circuit 4 will not be conditioned and AND circuit 10 will not be conditioned. The output of AND circuit 10 will, therefore, not be present to condition AND circuit 16 and the complement output of AND circuit 16 will be present to provide a third input to AND circuit 20 which, will generate an erroneous sum of ONE through OR circuit 30.

The third combination of the group is that in which the *b* and the *c*–1 inputs are ONE and the *a* input is ZERO. The input *b* conditions OR circuit 2, the output of which conditions OR circuit 6, so that output 22 provides the second input to AND circuit 20. The third input to AND circuit 20 is provided by the complement output of AND circuit 16. The input to AND circuit 16, which is provided by the output of AND circuit 10, is not present because of the absence of an input from AND circuit 4, due to the *a* input being ZERO. Therefore, AND circuit 20 again provides a sum of ONE through OR circuit 30.

A group of three other combinations of the input variables comprises those in which any one of the input variables is ONE and the other two input variables are ZERO. Under this condition, the sum should be ONE and the carry ZERO. If the carry is ONE, the carry complement output 14 of OR circuit 12 will be deconditioned and the output of AND circuit 20 will necessarily be suppressed. AND circuit 26 cannot generate a sum of ONE output signal if either input *a* or input *b* is ONE because this would provide an output from OR circuit 2 to condition OR circuit 6, causing the complement output 24 of OR circuit 6 to decondition one of the inputs of AND circuit 26. If the *c*–1 input is ONE, this provides another input to OR circuit 6, thus causing the deconditioned complement output 24 to prevent AND circuit 26 from generating a sum of ONE. Likewise, AND circuit 28 cannot generate a sum of ONE because the input to AND circuit 28 from the output of AND circuit 10 will not be present. The output of AND circuit 10 is not present because its input from AND circuit 4 will never be present under this group of combinations in which only one of the inputs is present.

The remaining input combination is that in which all input variables are ZERO, in which case, the sum and the carry should be ZERO. If a carry of ONE is generated, a sum of ONE should also be generated and this is done by AND circuit 26. One input of AND circuit 26 is taken from the carry output itself and is, therefore, conditioned. Since none of the input variables are ONE, OR circuit 2 is not conditioned and its output cannot condition OR circuit 6, nor can input *c*–1 condition the other input of OR circuit 6. Therefore, the complement output 24 of OR circuit 6 will serve to condition the remaining input of AND circuit 26, thus providing a sum of ONE.

Figure 2:
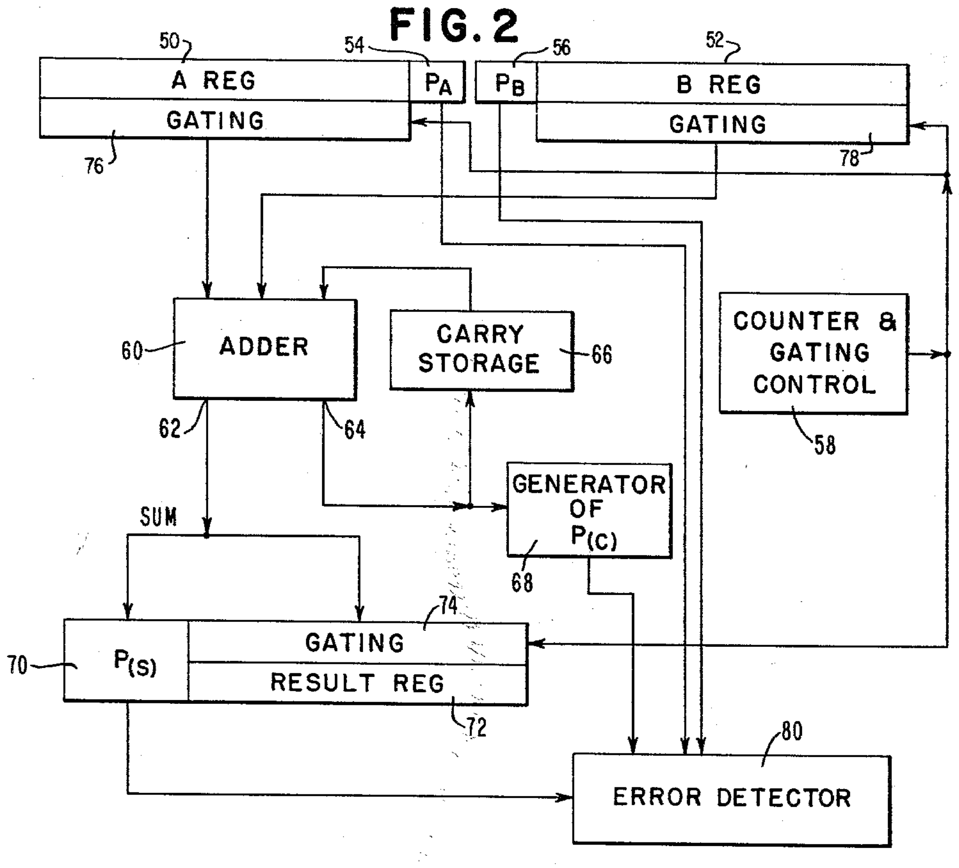
FIG. 2 is a diagram of a serial adder system in which the adder of the invention may be incorporated.

Referring now to FIG. 2, there is shown a block diagram of a serial adder. It will be recalled that reference was made hereinbefore to copending application of Harrison, et al., now Patent No. 3,036,770, in which a parity check of an arithmetic operation in a parallel arithmetic unit is described. An adder of the type shown in FIG. 1 may also be utilized in a serial adder as shown in FIG. 2, to reduce the number of undetectable single failures.

An A register 50 is utilized to store the augend digits and a B register 52 is utilized to store the addend digits. A parity bit storage unit 54 stores the parity bit for A register 50 and a parity bit storage unit 56 is utilized to store the parity of the contents of the B register 52. A counter and gating control circuit 58 controls the timing of the serial adder to gate out one bit of the A register and the corresponding single bit of the B register into adder 60 which generates a sum of output 62 and a carry at output 64 as a function of the input from the A register 50, the B register 52, and from a carry storage unit 66. The carry storage unit 66 stores the carry which is generated at output 64 of adder 60 for one bit time as controlled by the counter and gating control circuit 58, at which time it is re-entered into the adder circuit with the next higher order bits from the A register 50 and the B register 52. Each time a carry bit is generated at the output 64 of adder 60 it is counted by parity generator 68. Each time a sum is generated at output 62 of adder 60, it is counted in the parity counter 70 and also entered into the appropriate order of result register 72 through gating circuitry 74.

The counter and gating control circuit 58 gates the appropriate bits out of A register 50 through gating circuit 76 and out of the B register 52 through gating circuitry 78. At the completion of the addition operation, the parity of the A register parity storage unit 54, the parity of the B register parity storage unit 56, the parity of the sum parity storage unit 70 and the parity of the carries as generated in the parity generator 68 are compared in error detector circuit 80 which indicates whether or not the sum modulo two of the parities of the addend, the augend, the sum and the carries is equal to zero. ZERO, of course, is the correct sum modulo two.

While the invention has been particularly shown and described with reference to a preferred embodiment thereof, it will be understood by those skilled in the art that various changes in form and details may be made therein without departing from the spirit and scope of the invention.

I claim:

1. In a binary full adder, the combination comprising:
- means for generating a sum signal and a carry signal as a function of three binary input signals;
- and means for detecting an erroneous carry signal;
- said sum generating means being responsive to said detection means to provide an erroneous sum signal when an erroneous carry signal is detected.

2. In a binary full adder, the combination comprising:
- first, second and third input means;
- circuit means responsive to said first, second and third input means for generating a carry output in response to the presence of two or more inputs, for generating the complement of said carry output in response to the presence of only one input, for generating a first output in response to the presence of any one or more inputs, for generating a second output in response to the presence of no inputs, and for generating a third output in response to the presence of all three inputs;
- first means responsive to said carry complement output and said third output of said circuit means for generating an output except when both said outputs are present;
- second means for generating an output in response to the presence of both said carry output and said second output of said circuit means;
- third means for generating an output in response to the presence of both said carry and said third output of said circuit means;
- fourth means responsive to said first output and said carry complement output of said circuit means and to said output of said first means for generating an output when all are present;
- and a fifth means for generating an output upon receiving an output from any of said second, third, or fourth means.

3. In a binary full adder for combining a first and a second binary input with a carry input to develop a binary sum and a binary carry, the combination comprising:
- a first OR circuit for generating an output in response to the presence of either one of said first and second inputs;
- a first AND circuit for generating an output in response to the presence of both said first and second inputs;
- a second OR circuit connected to the output of said first OR circuit and to the carry input for generating a first output signal when either said first OR circuit output or said carry input is present and for generating a second output signal which is the complement of said first output signal when neither said output nor said input is present;

- a second AND circuit responsive to said carry input and to the output of said first AND circuit for generating an output if both are present;
- a third AND circuit responsive to the output of said first OR circuit and to said carry input for generating an output if both are present;
- a third OR circuit responsive to an output from either said first AND circuit or from said third AND circuit for generating a carry output and responsive to an absence of outputs from said first and third AND circuits for generating a carry complement output;
- an AND NOT circuit responsive to the output of said second AND circuit and to the complement output of said third OR circuit for generating an output unless both are present;
- a fourth AND circuit responsive to a coincidence of outputs from said first output of said second OR circuit, said AND NOT circuit and said complement output of said third OR circuit for generating an output;
- a fifth AND circuit responsive to a coincidence of said second output of said second OR circuit and to said carry output of said third OR circuit for generating an output;
- a sixth AND circuit responsive to a coincidence of said output of said second AND circuit and said carry output of said third OR circuit for generating an output;
- and a fourth OR circuit which generates an output in response to an output from said fourth, or fifth, or sixth AND circuits.

4. In a binary full adder for generating the sum modulo two and carry outputs as a function of addend, augend, and carry inputs, said sum and carry outputs, and said addend, augend and carry inputs each being represented by signals characteristic of a ONE or a ZERO, the combination comprising:
- first means for generating a first signal when either of said addend or augend inputs is a ONE;
- second means for generating a second signal when both said addend and augend inputs are ONE;
- third means responsive to predetermined combinations of said first and second signals and said carry input for generating a carry output; and
- fourth means responsive to said first and second signals, said carry input, and said carry output for generating an incorrect sum output in response to an inconsistency between the carry output and the input signals.

5. In a binary full adder for generating the sum modulo two and carry outputs as a function of addend, augend, and carry inputs, said sum and carry outputs, and said addend, augend and carry inputs each being represented by signals characteristic of a ONE or a ZERO, the combination comprising:
- first means for generating a first signal when either of said addend or augend inputs is a ONE;
- second means for generating a second signal when both said addend and augend inputs are ONE;
- third means responsive to predetermined combinations of said first and second signals and said carry input for generating a carry output; and
- multiple purpose means for comparing said inputs with said carry output to suppress the generation of a correct sum output when said three inputs are each a ONE and said carry output is a ZERO, and to generate an incorrect sum output when two of said inputs are each a ONE and said carry output is a ZERO or when said three inputs are each a ZERO and said carry output is a ONE.

6. In a binary full adder for generating the sum modulo two and carry outputs as a function of addend, augend, and carry inputs, said sum and carry outputs, and said addend, augend and carry inputs each being represented by signals characteristic of a ONE or a ZERO, the combination comprising:

first means for generating a first signal when either of said addend or augend inputs is a ONE;

second means for generating a second signal when both said addend and augend inputs are ONE;

third means responsive to predetermined combinations of said first and second signals and said carry input for generating a carry output;

suppression means operable when all three said inputs are ONE and said carry output is ZERO for producing a sum output of ZERO;

duplex means responsive to any two said inputs of ONE and a carry output of ZERO for producing a sum output of ONE, and responsive to a single input of ONE and a carry output of ONE for producing a sum output of ZERO; and means responsive to all three inputs of ZERO and a carry output of ONE for producing a sum output of ONE.

References Cited by the Examiner

UNITED STATES PATENTS

| | | | |
|---|---|---|---|
| 2,693,907 | 11/54 | Tootill | 235—176 |
| 2,758,787 | 8/56 | Felker | 235—176 |
| 2,841,740 | 7/58 | Bland et al. | 235—176 |

MALCOLM A. MORRISON, *Primary Examiner.*

WALTER W. BURNS, Jr., *Examiner.*